United States Patent [19]
Stafford et al.

[11] Patent Number: 5,195,800
[45] Date of Patent: Mar. 23, 1993

[54] PLATE WALL TRAILER

[75] Inventors: Brian K. Stafford; Donald M. Brown, Jr.; Gregory Radanovic, all of Fort Madison; Mark T. Grimm; Roger L. Niebuhr, both of Burlington, all of Iowa

[73] Assignee: Fruehauf Trailer Corporation, Southfield, Mich.

[21] Appl. No.: 840,318

[22] Filed: Feb. 24, 1992

[51] Int. Cl.$^5$ ............................................. B62D 33/04
[52] U.S. Cl. .................................... 296/181; 296/182; 296/183; 105/396
[58] Field of Search ...................... 296/181, 183, 182; 105/396, 404

[56]           References Cited
        U.S. PATENT DOCUMENTS

| | | | |
|---|---|---|---|
| 4,015,876 | 4/1977 | Hulverson et al. | 296/28 |
| 4,685,721 | 8/1987 | Banerjea | 296/181 |
| 4,810,027 | 3/1989 | Ehrlich | 296/181 |
| 4,904,017 | 2/1990 | Ehrlich | 296/181 |
| 4,940,279 | 7/1990 | Abott et al. | 296/181 |
| 5,058,756 | 10/1991 | Green | 296/181 |
| 5,066,066 | 11/1991 | Yurgevich et al. | 296/181 |

Primary Examiner—Robert R. Song
Attorney, Agent, or Firm—Willian Brinks Olds Hofer Gilson & Lione

[57]                ABSTRACT

An enclosed trailer for towing by an over the road truck is provided having increased internal width for a given external width. The side walls of the trailer are constructed from a series of vertically extending, spaced apart, rigid plates, preferably metallic plates, and metallic reinforcing members which have an inwardly projecting, vertically extending rib that is positioned between the adjacent edges of adjacent pairs of plates. The reinforcing members are riveted or otherwise rigidly secured to the outside of a pair of plates. Furthermore, the plates and reinforcing members are also rigidly secured to vertically extending flanges of the longitudinally extending top and bottom beams which form the juncture between the side walls and the top wall, and the side walls and the bottom wall, respectively. Because all elements of the trailer side walls are rigidly joined to the top and bottom beams, the overall strength and rigidity of the trailer is increased.

23 Claims, 4 Drawing Sheets

PLATE WALL TRAILER

BACKGROUND OF THE INVENTION

1. Field Of The Invention

This invention relates to an enclosed trailer for attachment to an over the road truck. More particularly, this invention relates to a trailer of the foregoing character each of whose opposed side walls is formed from a longitudinally extending series of vertically oriented, relatively thick, relatively low density rectangular metallic plates.

2. Description Of The Prior Art

Conventional enclosed trailers have opposed side walls, each of which is formed from a longitudinally extending, vertically oriented series of relatively thin, aluminum alloy sheets with overlapping side edges. Each of the joints or seams that is formed by the overlapping side edges of an adjacent pair of sheets is reinforced by a relatively deep post, which is usually of a generally hat-shaped configuration, either on the inside or the outside of the side wall and in alignment with the overlapping edges of the adjacent sheets. A side wall of this construction is relatively light in weight for a suitable level of strength and rigidity, but is also relatively thick, in a side-to-side direction, because of the required depth of the reinforcing posts. This thickness comes at the expense of the internal width of the trailer, because overall trailer width is usually limited by applicable statutes and regulations for towing a trailer over public roads and highways. As a consequence of such a limitation on internal trailer widths, the trailer payload is limited when freight volume is the limiting loading factor, as it often is when the trailer is used to transport low density merchandise.

It is known that the internal width of a trailer can be increased by using relatively thick metallic or composite plates in the construction of the trailer side walls, in place of the relatively thin metallic sheets of the aforesaid sheet and post construction, notwithstanding that this plate wall construction adds to the weight and initial cost of a trailer. Such plates add greater strength and rigidity than the relatively thin sheets of the sheet and post type of trailer construction as described above, and as a consequence of the greater strength and rigidity of the plate wall construction, it does not require the reinforcing posts of substantial depth of the sheet and post construction. U.S. Pat. Nos. 4,810,027 (Ehrlich), 4,904,017 (Ehrlich) and 4,940,279 (Abott et al.) describe various types of plate wall trailers which are known in the art. While the constructions of the trailers of the aforesaid patents do utilize external reinforcing members in the plate wall constructions thereof, the reinforcing members of these trailers can be substantially less deep than the reinforcing posts of a sheet and post trailer of comparable size, and, when the edges of the adjacent plates in an adjacent pair of plates of a plate wall trailer are not overlapped in accordance with the teachings of the aforesaid patents, the side wall of a plate wall trailer will be substantially thinner than its counterpart in a sheet and post trailer, thus providing greater internal width for a given trailer overall width. Unfortunately, in the plate wall trailers of the aforesaid U.S. patents, the reinforcing members of the trailer walls are not directly connected to the longitudinally extending beam at the top of each wall. Thus, the reinforcing members do not contribute to the overall rigidity of the trailer structure as effectively as they would if each of them had sufficient extent to overlap and be riveted, or overwise rigidly joined, to the longitudinally extending beams at the upper ends of the trailer side walls.

SUMMARY OF THE INVENTION

In accordance with the present invention there is provided an enclosed trailer for towing by an over the road truck. Each of the side walls of the trailer of the present invention is formed from a longitudinally extending series of vertically oriented, relatively thick and rigid plates, such as aluminum alloy plates. Each adjacent pair of plates has adjacent, vertically extending edges which do not overlap and which are joined and reinforced by a relatively thin, vertically extending reinforcing member which is positioned externally thereof. Preferably, the adjacent edges of an adjacent pair of plates are spaced apart from one another by a small but finite distance, and the reinforcing member is provided with an inwardly projecting and vertically extending rib which is positioned between the adjacent edges of an adjacent pair of plates to assist in the precise positioning of the plates with respect to one another during the assembly of the trailer. The rib of the reinforcing member also increases its section modulus in a direction extending transversely of the reinforcing member and, thus, its resistance to bending in such direction under a given load.

A trailer according to the present invention is also provided with longitudinally extending beams at the top and bottom of each side wall, respectively, and each beam is configured with a vertically extending flange. Each wall plate is riveted or otherwise secured to an outwardly facing surface of such vertically extending flange, and this permits the outwardly positioned reinforcing members of the plate wall to be sufficiently long to overlap the flanges of the top and bottom beams and to be riveted or otherwise rigidly affixed thereto, thereby adding to the rigidity of the trailer construction. When each reinforcing member is provided with an inwardly projecting rib to separate the spaced apart edges of an adjacent pair of plates, as described, it is necessary to machine away the rib from any portion of the reinforcing member which extends beyond the horizontally extending edges of the pair of plates to which it is joined, to permit such portion of the reinforcing member to be attached to the vertically extending flange of the adjacent longitudinally extending beam in flush, surface to surface contact.

Accordingly, it is an object of the present invention to provide an improved enclosed trailer for attachment to an over the road truck. More particularly, it is an object of the present invention to provide a trailer of the foregoing character with relatively thin side walls for increased internal width for a given external width. It is also an object of the present invention to provide a trailer of the foregoing character in which all elements of the trailer side walls are rigidly joined to longitudinally extending beams at the top and bottom of each side wall.

For a further understanding of the present invention and the objects thereof, attention is directed to the drawing and to the following brief description thereof, to the detailed description of the preferred embodiment, and to the appended claims.

DETAILED DESCRIPTION OF THE PREFERRED EMBODIMENT

Figure 1:
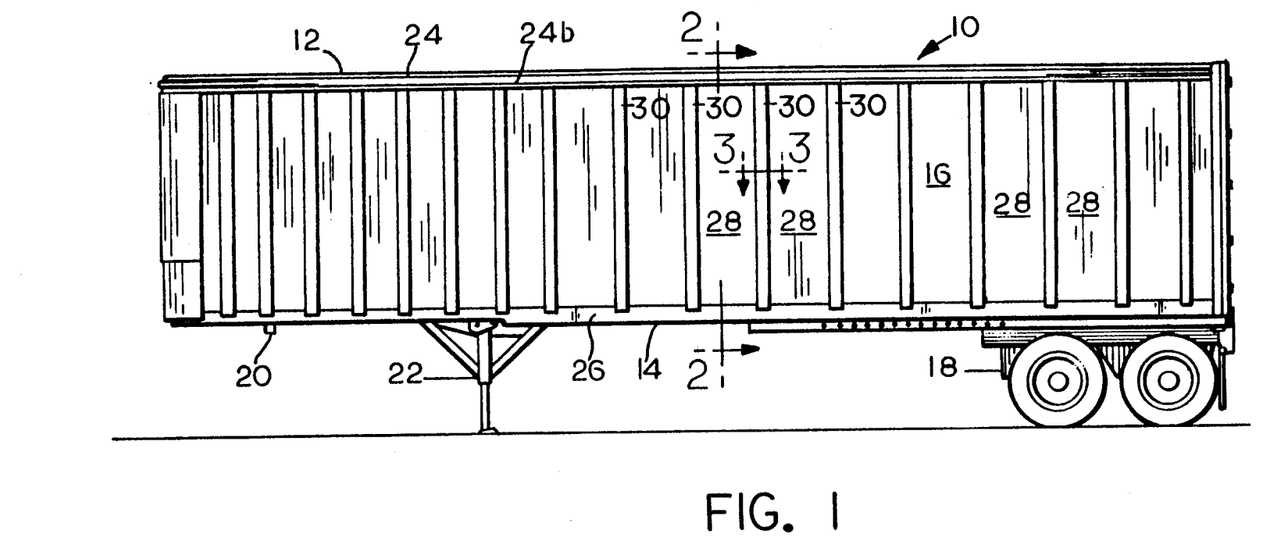
FIG. 1 is an elevation view of a trailer in accordance with the preferred embodiment of the present invention.

A trailer according to the present invention is indicated generally by reference numeral 10 in FIG. 1 and is made up of a top wall 12, a bottom wall 14 and an opposed pair of spaced apart, like but oppositely facing, side walls extending from the top wall 12 to the bottom wall 14, only one of such side walls, the side wall 16, being shown in the drawing. An end of the bottom wall 14 of the trailer 10, which is at the rear of the trailer 10 in its ordinary mode of travel, is attached to and supported by a wheel assembly 18 to permit the trailer 10 to be towed over a road or highway by a truck, not shown, to which the trailer 10 is adapted to be attached, the bottom wall of the trailer 10 further being provided with a depending king pin 20 near its front end to facilitate its attachment to such truck. The bottom wall 14 of the trailer 10 is also provided with a retractable landing gear assembly 22 to permit the trailer 10 to be supported in a relatively horizontal position when it is not connected to a truck, with the king pin 20 positioned at a sufficient distance above the ground or other trailer supporting surface to permit the attaching gear of a truck to be moved thereunder for connection thereto. The trailer 10 is also closed at its front end by a wall, not shown, which extends between its side walls and at its rear end by an opposed pair of doors, also not shown, which are hingedly attached to the opposed side walls, respectively. Preferably, the trailer 10 has a generally wedge shaped configuration, with a downwardly sloping bottom wall 14, as described in U.S. Pat. No. 4,015,876 (Hulverson, et al.).

The trailer 10 is provided with longitudinally extending top and bottom beams 24, 26 on each side thereof, at the junctures between the top wall 12 and the side wall 16, and between the bottom wall 14 and the side wall 16, respectively. The top and bottom beams 24, 26 are manufactured of a relatively low density metallic material, such as an aluminum alloy, and each may be integrally manufactured in its illustrated complex shape in a single piece by an extrusion process.

Figure 3:
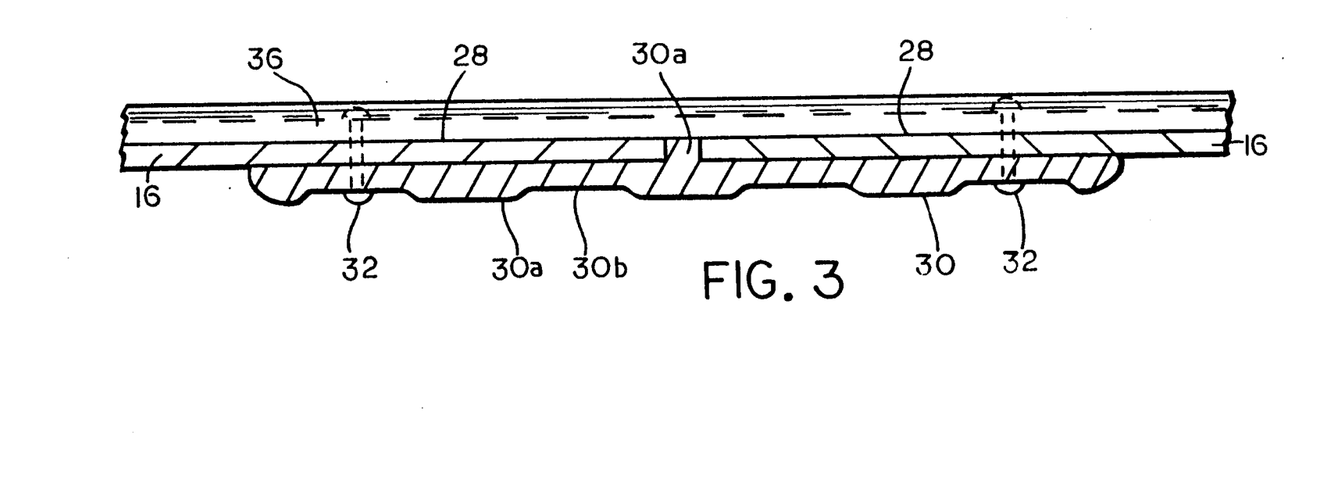
FIG. 3 is a fragmentary sectional view, at a further enlarged scale, taken on line 3—3 of FIG. 1.

The side wall 16 is made up of a longitudinally extending series of vertically oriented rectangular plates 28, for example, aluminum alloy or other low density metallic plates. The use of plates of a composite construction in accordance with the teachings of the aforesaid U.S. Pat. No. 4,940,279 (Abbott et al.) is also contemplated. In any case, each of the plates 28 is of an appropriate thickness to impart substantial strength and rigidity thereto, for example, a thickness of at least approximately 0.125 inch, and preferably at least approximately 0.160 inch, in the case of an aluminum alloy, and preferably the rectangular plates 28 are of a uniform thickness and top to bottom height throughout the length of the trailer 10. Because of the thickness of the plates 28, which is substantially greater than the thickness of the sheets used in sheet and post trailers, the adjacent edges of adjacent plates are not overlapped, and are preferably spaced apart from one another, as is shown most clearly in FIGS. 3 and 4. Each adjacent pair of edges of an adjacent pair of the plates 28 is riveted or otherwise rigidly joined to a vertically extending reinforcing member 30, which is positioned externally of the side wall 16, that is, on the side of the side wall 16 which is on the exterior of the trailer 10. When the adjacent edges of each adjacent pair of plates 28 are spaced apart from one another, as described above, each reinforcing member 30 is provided with an inwardly projecting rib 30a which serves to fill the space between an adjacent pair of plates 28 and to assist in the precise location of the plates 28 relative to one another during the assembly of the trailer 10. Further, the rib 30a adds depth to the reinforcing member 30 without increasing its depth externally of the plates 28, thereby increasing the section modulus of the reinforcing member 30 and its resistance to bending in a direction extending transversely to the side wall 16 for a given amount of material in the reinforcing member 30. The reinforcing member 30 further preferably includes a pair of spaced apart, inwardly projecting and vertically extending recesses 30b in its outer surface to receive the outwardly projecting heads of rivets 32, which are used to join the reinforcing member 30 to the underlying plates 28. The use of the recesses 30b obviates the need to use countersunk fasteners to join a reinforcing member to an underlying plate, as is often the case in prior art plate wall trailers to prevent contact damage to exposed rivet heads, especially those in the lower portion of the trailer.

Figure 2:
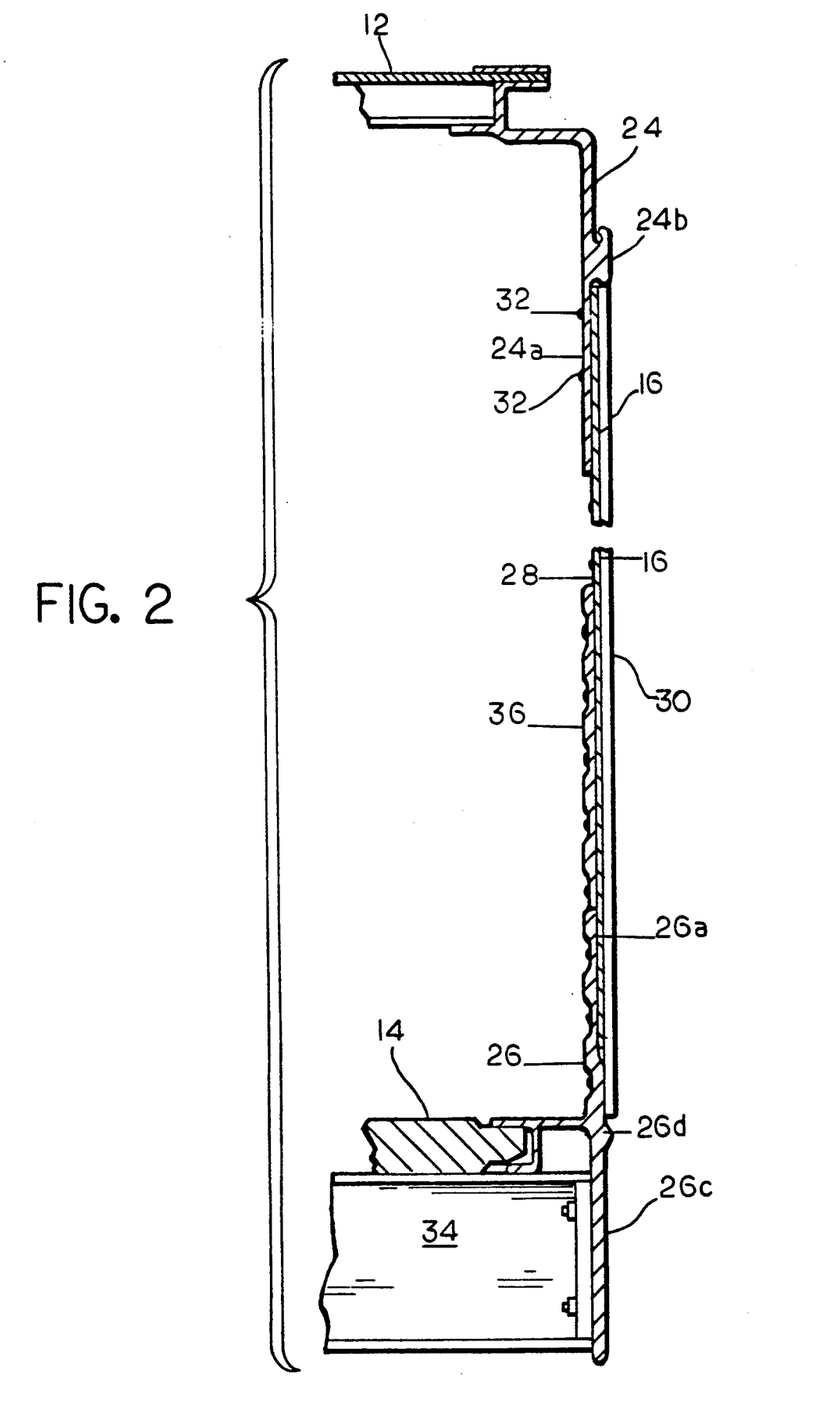
FIG. 2 is a fragmentary sectional view, at an enlarged scale, taken on line 2—2 of FIG. 1.
Figure 4:
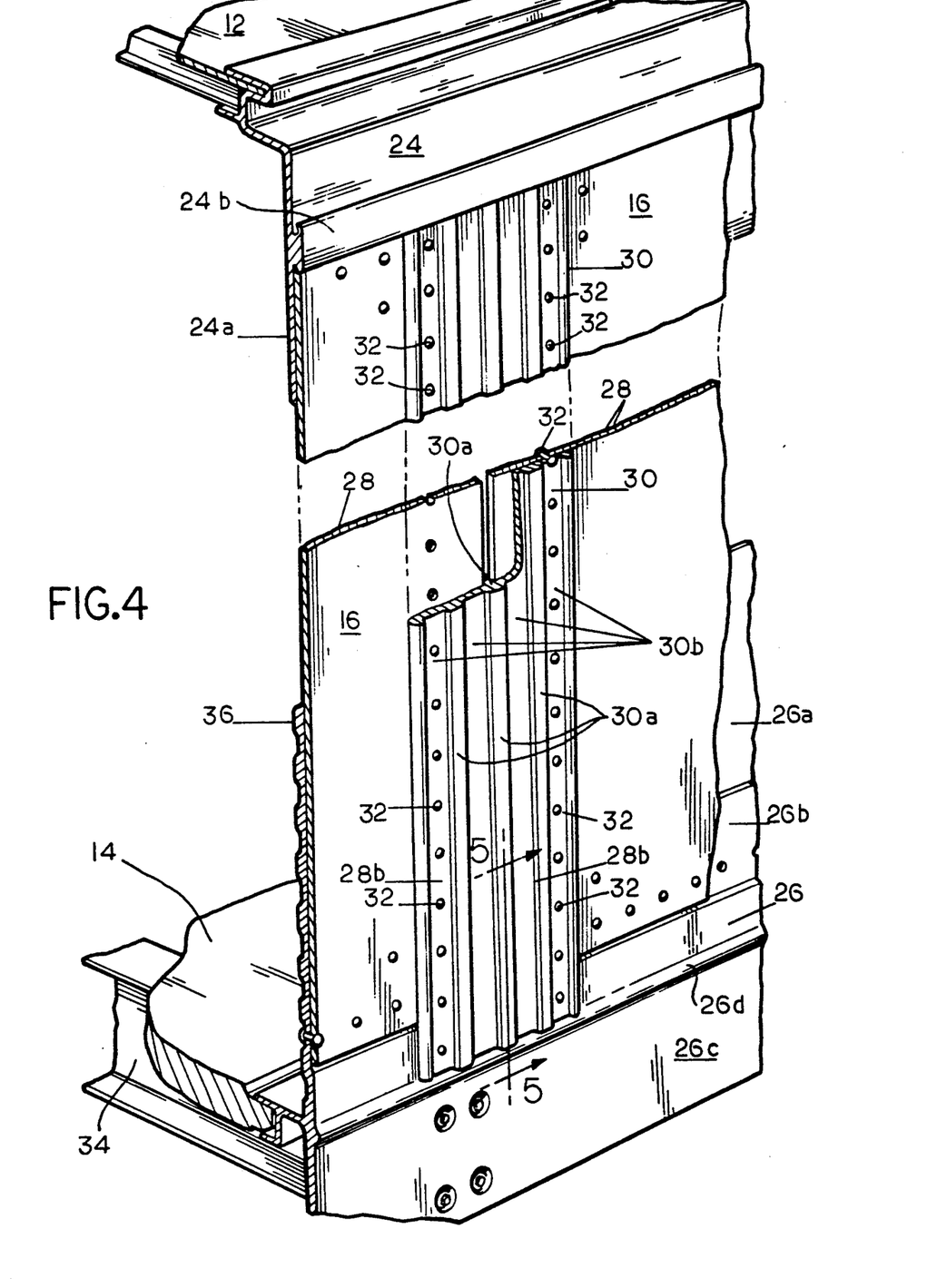
FIG. 4 is a fragmentary perspective view of a portion of the trailer of FIGS. 1-3.

The upper portion of each of the plates 28 is riveted or otherwise rigidly secured to the outwardly facing surface of a downwardly extending leg 24a of the adjacent top beam 24, which is generally L-shaped in transverse cross-section, with a substantial overlap therebetween, as is shown most clearly in FIGS. 2 and 4. Thus, the joint between the plates 28 and the top beam 24 is quite rigid, and serves to impart substantial rigidity to the trailer 10 throughout its length. Further, the positioning of the plates 28 externally of the leg 24a on the top beam 24 makes it possible to extend each reinforcing member 30 to an elevation which is well above the bottom edge of the leg 24a, thus permitting a substantial portion of each reinforcing member 30 to be riveted or otherwise rigidly secured to the leg 24a, as well as to the underlying adjacent plates 28, further imparting rigidity to the joint between the top beam 24, the plates 28 and the reinforcing members 30, and to the trailer 10 throughout its length. As is shown in FIG. 4, the exterior of the leg 24a of the top beam 24 is provided with an outwardly projecting, longitudinally extending, generally T-shaped rib 24b above the upper edges of the plates 28 and the reinforcing member 30 to protect the upper edges of the plates 28 and the reinforcing members 30 from impact damage that could otherwise tend to separate them from the top beam 24 and to prevent rain water and road dirt from entering the trailer 10 through any opening between an adjacent pair of the plates 28. If the trailer 10 is constructed with a downwardly sloping bottom wall 14, the leg 24a of the top beam 24 will preferably have a little greater vertical height at the rear of the trailer 10 than at the front, for example, approximately 1.5 inch greater, according to the teachings of the aforesaid U.S. Pat. No. 4,015,876 (Hulverson et al.).

The bottom portion of each of the plates 28 is riveted or otherwise rigidly secured to an inwardly recessed portion 26a of a vertically upwardly extending leg 26b of the bottom beam 26, which is generally T-shaped in transverse cross-section, with a vertically extending head portion and a horizontally extending shank portion, the leg 26b comprising the upper portion of the head portion, and with a substantial overlap therebetween, as is shown quite clearly in FIGS. 2 and 4. Thus, the joint between the plates 28 and the bottom beam 26 is quite rigid, and further serves to impart substantial rigidity to the trailer 10 throughout its length. Further, the positioning of the plates 28 externally of the upwardly extending leg 26b of the bottom beam 26 makes it possible to extend each reinforcing member 30 to an elevation which is substantially below the top edge of the leg 26b, thus permitting a substantial portion of each reinforcing member 30 to be riveted or otherwise rigidly joined to the leg 26b, as well as to the underlying adjacent plates 28, and further imparting rigidity to the joint between the bottom beam 26, the plates 28 and the reinforcing member 30 and to the trailer 10 throughout its length. In fact, by providing the leg 26b of the bottom beam 26 with an inwardly recessed portion 26a to which the plates 28 are attached, as described above, it is possible to extend each reinforcing member 30 to a level below that of the plates 28 to which it is affixed. Thus, each reinforcing member extends to a position that is closer to the level of longitudinally spaced apart and transversely extending beams 34 which underlie and support the bottom wall 16, and which are secured to a downwardly extending leg 26c of the bottom beam 26, further maximizing the rigidity of the joint formed by the plates 28, the bottom beam 26, the reinforcing members 30, and the transversely extending beams 34, and to the trailer 10 throughout its length.

Figures 5, 6:
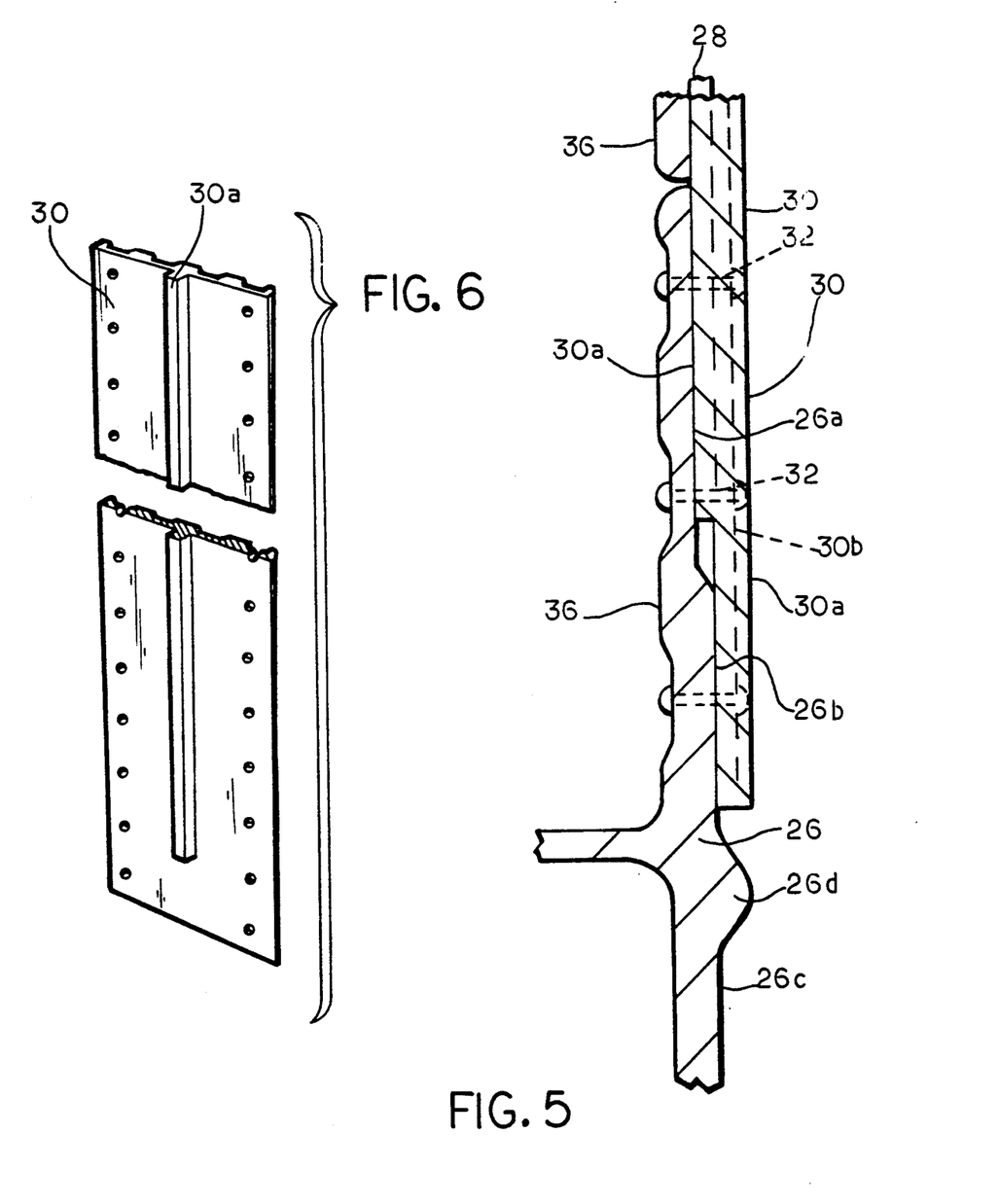
FIG. 5 is a fragmentary sectional view taken on line 5—5 of FIG. 4.
FIG. 6 is a broken, perspective view of an element of the trailer of FIGS. 1-5.

When the plates 28 are secured to a recessed portion 26a of a vertically extending leg 26b of the bottom beam 26, as heretofore described, it is desirable to discontinue the portion of the rib 30a of the reinforcing member 30 which would otherwise extend below the bottom edge of the underlying plates 28, as is shown most clearly in FIGS. 5 and 6. This feature can be imparted to an extruded reinforcing member 30 by machining away the lowermost portion of the rib 30a, the portion which would otherwise extend to the bottom of the reinforcing member 30. This will permit the lowermost portion of the reinforcing member 30 to be riveted or otherwise rigidly affixed to a non-recessed portion of the leg 26b of the bottom beam 26 in flush, surface to surface engagement therewith. In any case, the bottom beam 26 is preferably also provided with an outwardly projecting, longitudinally extending bead 26d immediately below the bottom edges of the reinforcing members 30 to protect the bottom edges of the reinforcing members 30 from contact damage that could cause them to separate from the bottom beam 26.

By positioning the plates 28 to the exterior of the vertically extending leg 26b of the beam 26, as heretofore described, the leg 26b will serve to protect the bottom portion of each plate 28 from being gouged or otherwise damaged by contact during the loading or unloading of the trailer 10, for example, from being gouged by the tines of a forklift truck of the type which is often used in the loading or unloading of such trailers.

Further, additional protection against contact damage to the inside surfaces of the plates 28 can be provided by affixing protection plates 36, which may be of extruded aluminum alloy construction, to the interior surface of the plates 28. The protection plates 36 preferably extend from a level immediately above the top edge of leg 26b of the beam 26 to a suitable elevation within the trailer 10, that is, an elevation above the level of likely contact damage to the plates 28.

Although the best mode contemplated by the inventors for carrying out the present invention as of the filing date hereof has been shown and described herein, it will be apparent to those skilled in the art that suitable modifications, variations, and equivalents may be made without departing from the scope of the invention, such scope being limited solely by the terms of the following claims.

What is claimed is:

1. A trailer body comprising:
  a top wall;
  a bottom wall positioned beneath said top wall;
  an opposed pair of spaced apart side walls extending between said top wall and said bottom wall;
  a top beam extending along a juncture between said top wall and one of said side walls, said top beam having a flange portion which extends downwardly partly to the bottom wall;
  a bottom beam extending along a juncture between said bottom wall and said one of said side walls;
  said one of said side walls comprising;
  a longitudinally extending plurality of relatively rigid, vertically oriented, co-planar plates, the adjacent edges of each adjacent pair of plates being non-overlapping and substantially co-planar, each of said plates being rigidly secured to an outwardly facing surface of said flange portion of said top beam and being rapidly secured to said bottom beam;
  a plurality of generally vertically extending reinforcing members positioned outwardly of said one of said side walls, each reinforcing member overlapping and covering an adjacent pair of edges of an adjacent pair of said plates and being rigidly secured to each of said adjacent pair of said plates, each reinforcing member extending to an elevation above a bottom edge of said flange portion of said top beam, an upper portion of said each reinforcing member being rigidly secured to said flange portion and to an upper portion of said each of said adjacent pair of said plates which is positioned therebetween; and
  wheel means secured to said bottom wall to permit said trailer body to be towed by a truck;
  wherein the adjacent edges of each adjacent pair of plates are spaced apart from each other, and wherein each reinforcing member has an inwardly projecting, vertically extending rib positioned between the adjacent edges of an adjacent pair of plates, said vertically extending rib helping to accurately position the plates of said adjacent pair of plates relative to each other during the assembly of the trailer body and serving to increase the section modulus and resistance to bending of said reinforcing member in a direction extending transversely of said one of said side walls.

2. A trailer body according to claim 1 wherein each of said plates is formed of a relatively low density metallic material.

3. A trailer body according to claim 2 wherein said metallic material is an aluminum alloy, and wherein the thickness of each said plates is at least approximately 0.125 inch.

4. A trailer body according to claim 3 wherein said thickness is at least approximately 0.160 inch.

5. A trailer body according to claim 3 wherein the thickness of each of said plurality of plates is uniform throughout the length of said trailer body.

6. A trailer body according to claim 1 wherein said flange portion of said top beam has an outwardly projecting and longitudinally extending rib positioned immediately above the tops of said plurality of plates and said plurality of reinforcing members to protect the tops of said plurality of plates and said plurality of reinforcing members and to substantially prevent contaminants from entering said trailer body through openings between each adjacent pair of plates.

7. A trailer body according to claim 6 wherein said rib of said flange portion of said top beam is generally T-shaped in transverse cross-section.

8. A trailer body according to claim 1 wherein each of said reinforcing members is formed from an aluminum alloy by extrusion.

9. A trailer body according to claim 1 wherein said top beam is generally L-shaped in transverse cross-section and is formed from an aluminum alloy by extrusion.

10. A trailer body according to claim 1 wherein said opposed pair of spaced apart side walls comprises said one of said side walls and a second side wall, said second side wall being oppositely facing with respect to said one of said side walls but otherwise like said one of said side walls, and further comprising;
  a second top beam extending along a juncture between said top wall and said second side wall, said second top beam being oppositely facing with respect to said top beam but otherwise like said top beam.

11. A trailer body according to claim 10 and further comprising;
  a second bottom beam extending along a juncture between said second bottom wall and said second side wall, said second bottom beam being oppositely facing with respect to said bottom beam but otherwise like said bottom beam.

12. A trailer body comprising:
  a top wall;
  a bottom wall positioned beneath said top wall;
  an opposed pair of spaced apart side walls extending between said top wall and said bottom wall;
  a top beam extending along a juncture between said top wall and one of said side walls;
  a bottom beam extending along a juncture between said bottom wall and said one of said side walls, said bottom beam having a flange portion which extends upwardly partly to the top wall, said flange portion having a recessed upper portion;
  said one of said side walls comprising;
  a longitudinally extending plurality of relatively rigid, vertically oriented, co-planar plates, the adjacent edges of each adjacent pair of plates being non-overlapping and substantially co-planar, each of said plates being rigidly secured to an outwardly facing surface of said upper recessed portion of said flange portion of said bottom beam and being secured to said top beam;
  a plurality of generally vertically extending reinforcing members positioned outwardly of said one of said side walls, each reinforcing member overlapping and covering an adjacent pair of edges of an adjacent pair of said plates, each reinforcing member extending to an elevation below the bottom of the upper recessed portion of said flange portion of said bottom beam and below the bottom edges of plates to which it overlaps, a lower portion of each reinforcing member being rigidly secured to said flange portion and to a lower portion of said each of said adjacent pair of said plates which is positioned therebetween; and
  wheel means secured to said bottom wall to permit said trailer body to be towed by a truck.

13. A trailer body according to claim 12 wherein each of said plates is formed of a relatively low density metallic material.

14. A trailer body according to claim 13 wherein said metallic material is an aluminum alloy, and wherein the thickness of each of said plates is at least approximately 0.125 inch.

15. A trailer body according to claim 14 wherein said thickness is at least approximately 0.160 inch.

16. A trailer body according to claim 12 wherein the thickness of each of said plurality of plates is uniform throughout the length of said trailer body.

17. A trailer body according to claim 12 wherein said flange portion of said bottom beam has an outwardly projecting and longitudinally extending rib positioned immediately below the bottoms of said reinforcing members to protect the bottoms of said reinforcing members.

18. A trailer body according to claim 17 wherein said bottom beam is generally T-shaped in transverse cross-section with a vertically extending head portion and a horizontally extending shank portion, said flange comprising an upper portion of said head portion, said bottom beam further having a downwardly depending flange portion, and further comprising;
  a spaced apart plurality of transversely extending beams positioned beneath and supporting said bottom wall of said trailer, each of said transversely extending beams having an end which is rigidly secured to said downwardly depending portion of said bottom beam.

19. A trailer body according to claim 12 wherein the adjacent edges of each adjacent pair of plates are spaced apart from each other, and wherein each reinforcing member has an inwardly projecting, vertically extending rib positioned between the adjacent edges of an adjacent pair of plates, said vertically extending rib helping to accurately position the plates of said adjacent pair of plates relative to each other and serving to increase the section modulus and resistance to bending of said reinforcing member in a direction extending transversely of said one of said side walls.

20. A trailer body according to claim 19 wherein each of said reinforcing members is formed from an aluminum alloy by extrusion, the portion of said vertically extending rib that extends below the edges of said plates being removed by machining to permit a lowermost portion of said reinforcing member to be affixed to said flange portion of said bottom beam in flush, face to face engagement.

21. A trailer body according to claim 12 wherein said opposed pair of spaced apart walls comprises said one of said side walls and a second side wall, said second side wall being oppositely facing with respect to said one of said side walls but otherwise like said one of said side walls, and further comprising:

a second bottom beam extending along a juncture between said second bottom wall and said second side wall, said second bottom beam being oppositely facing with respect to said bottom beam but otherwise like said bottom beam.

22. A trailer body according to claim 21 and further comprising:

a second top beam extending along a juncture between said top wall and said second side wall, said second top beam being oppositely facing with respect to said top beam but otherwise like said top beam.

23. A trailer body comprising:
a top wall;
a bottom wall positioned beneath said top wall;
an opposed pair of spaced apart side walls extending between said top wall and said bottom wall;
a top beam extending along a juncture between said top wall and one of said side walls;
a bottom beam extending along a juncture between said bottom wall and said one of said side walls, said bottom beam having a flange portion which extends upwardly partly to the top wall;
said one of said side walls comprising;
a longitudinally extending plurality of relatively rigid, vertically oriented, co-planar plates, the adjacent edges of each adjacent pair of plates being non-overlapping and substantially co-planar, each of said plates being rigidly secured to an outwardly facing surface of said upper recessed portion of said flange portion of said bottom beam and being secured to said top beam;

a plurality of generally vertically extending reinforcing members positioned outwardly of said one of said side walls, each reinforcing member overlapping and covering side walls, each reinforcing member overlapping and covering an outwardly facing, adjacent pair of edges of an adjacent pair of said plates, each reinforcing member extending to an elevation below the flange portion of said bottom beam and below the bottom edges of plates to which it overlaps, a lower portion of each reinforcing member being rigidly secured to said flange portion and to a lower portion of said each of said adjacent pair of said plates which is positioned therebetween;

metallic protection plates means attached to said one of said side walls, said protection plates means being positioned on an inwardly facing surface of said one of said side walls and extending upwardly from a location adjacent said bottom wall and partly to said top wall, said protection plate means serving to protect the bottom portions of the plates of said one of said side walls from contact damage during the loading or unloading of the trailer body; and wheel means secured to said bottom wall to permit said trailer body to be towed by a truck.

* * * * *

UNITED STATES PATENT AND TRADEMARK OFFICE
CERTIFICATE OF CORRECTION

PATENT NO. : 5,195,800

DATED : March 23, 1993

INVENTOR(S) : Brian K. Stafford et al.

It is certified that error appears in the above-identified patent and that said Letters Patent is hereby corrected as shown below:

Claim 1, column 6, line 37, "rapidly" should be --rigidly--.

Signed and Sealed this

Seventh Day of December, 1993

*Attest:*

BRUCE LEHMAN

*Attesting Officer*     *Commissioner of Patents and Trademarks*